United States Patent
Deshmukh et al.

(10) Patent No.: US 11,080,245 B2
(45) Date of Patent: Aug. 3, 2021

(54) MULTI-TIER CLOUD FILE SYSTEM

(71) Applicant: DaStratum, Inc., Sunnyvale, CA (US)

(72) Inventors: Vijay Mohan Deshmukh, Fremont, CA (US); Kapil Kumar, San Jose, CA (US); Anil Kumar Sharma, Mountain View, CA (US); Sudheer K. Rao Miryala, Saratoga, CA (US)

(73) Assignee: DaStratum, Inc., Sunnyvale, CA (US)

( * ) Notice: Subject to any disclaimer, the term of this patent is extended or adjusted under 35 U.S.C. 154(b) by 592 days.

(21) Appl. No.: 15/893,393

(22) Filed: Feb. 9, 2018

(65) Prior Publication Data

US 2018/0232395 A1    Aug. 16, 2018

Related U.S. Application Data

(60) Provisional application No. 62/457,773, filed on Feb. 10, 2017, provisional application No. 62/530,022, (Continued)

(51) Int. Cl.
*G06F 16/10* (2019.01)
*G06F 3/06* (2006.01)
(Continued)

(52) U.S. Cl.
CPC .......... *G06F 16/183* (2019.01); *G06F 3/0605* (2013.01); *G06F 3/067* (2013.01); (Continued)

(58) Field of Classification Search
None
See application file for complete search history.

(56) References Cited

U.S. PATENT DOCUMENTS 8,099,391 B1    1/2012  Monckton
8,443,153 B1    5/2013  Edwards et al.
(Continued)

FOREIGN PATENT DOCUMENTS

WO    2016032988 A1    3/2016

OTHER PUBLICATIONS

Amazon Web Services, "Amazon Elastic Compute Cloud", 2017, 817 pages.

(Continued)

*Primary Examiner* — Kristopher Andersen
(74) *Attorney, Agent, or Firm* — Haynes Beffel & Wolfeld LLP; Ernest J. Beffel, Jr.; Sikander M. Khan

(57) ABSTRACT

The technology disclosed relates to a STRADL file system that transparently deploys file blocks across multiple tiers of storage. In a cloud-based storage platform, multiple storage tiers host data via file system APIs. This includes a volatile storage (VS) tier with a VS API, a reliable non-volatile storage (RNVS) tier with a RNVS API, and a highly reliable non-volatile storage (HRNVS) tier with a HRNVS API. The STRADL file system provides an intermediary file system API that presents to a host system a single interface and translates get, put, and other file system requests into commands compatible with the VS API, the RNVS API, and the HRNVS API, without host system awareness of which of the multiple tiers holds requested data and metadata.

19 Claims, 7 Drawing Sheets

Related U.S. Application Data filed on Jul. 7, 2017, provisional application No. 62/530,026, filed on Jul. 7, 2017, provisional application No. 62/530,028, filed on Jul. 7, 2017, provisional application No. 62/530,031, filed on Jul. 7, 2017.

(51) Int. Cl.
*G06F 16/182* (2019.01)
*H04L 29/08* (2006.01)

(52) U.S. Cl.
CPC .......... *G06F 3/0617* (2013.01); *G06F 3/0643* (2013.01); *G06F 3/0649* (2013.01); *G06F 3/0661* (2013.01); *G06F 3/0685* (2013.01); *G06F 16/1827* (2019.01); *H04L 67/1097* (2013.01)

(56) References Cited

U.S. PATENT DOCUMENTS

| | | | | |
|---|---|---|---|---|
| 10,481,805 | B1* | 11/2019 | Sahin | G06F 3/0611 |
| 2010/0332401 | A1* | 12/2010 | Prahlad | H04L 67/1095 |
| | | | | 705/80 |
| 2014/0059311 | A1* | 2/2014 | Oberhofer | G06F 11/1461 |
| | | | | 711/162 |
| 2018/0067658 | A1* | 3/2018 | Tripathy | G06F 3/065 |
| 2018/0102985 | A1* | 4/2018 | Byers | H04L 47/823 |
| 2018/0121110 | A1* | 5/2018 | Sawhney | G06F 3/067 |

OTHER PUBLICATIONS

Bellur-GlusterFS, Architecture & Roadmap, Oct. 22, 2013, 54 pages.
Cohesity—Building a Modern, Web Scale Architecture for Consolidating Secondary Storage, 2015, 8 pages.
EMC Corporation. "EMC Isolon: ONEFS A Technical Overview", Jun. 2015, 38 pages.
Ghemawat, Sanjay, et. al., "The Google File System", Oct. 19-22, 2003, 15 pages.
Gluster, "An Introduction to Gluster Architecture", Version 3.1.x, 2011. 21 pages.
Hitz, Dave, et. al., "File System Design for an NFS File Server Appliance", Jan. 19, 1994, 23 pages.
Miller, Ethan L. "The What Why and How of the Pure Storage Enterprise Flash Array", Oct. 23, 2013, 59 pages.
nimblestorage, "Technology Overview", 2015, 4 pages.
Nutanix, "Nutanix Solution Note: Data Protection and Disaster Recovery", Version 1.0, Apr. 2015, 14 pages.
Olson, Eric, et. al., "SoftNAS Architecture on AWS", May 2015, 21 pages.
Kesden, Gregory, "Operation systems: Lecture 19", CMU, Oct. 10, 2001, 6 pages.
Baron, Joseph, et. al., "Storage options in the AWS cloud", Oct. 2013, 34 pages.
Weil, Sage A., et. al., "Ceph:, A Scalable High Performance Distributed File System", Nov. 2006, 14 pages.
Weil, Sage A., et. al., "RADOS: A Scalable Reliable Storage Service for Petabyte scale Storage Clusters", Nov. 2007, 10 pages.

* cited by examiner

MULTI-TIER CLOUD FILE SYSTEM

CROSS REFERENCE TO OTHER APPLICATIONS

This application claims the benefit of U.S. Provisional Application No. 62/457,773, entitled "FILE MANAGEMENT SYSTEM FOR CLOUD-BASED STORAGE", filed on Feb. 10, 2017. The provisional application is incorporated by reference for all purposes;

This application claims the benefit of U.S. Provisional Application No. 62/530,022 entitled "MULTI-TIER CLOUD FILE SYSTEM", filed Jul. 7, 2017. The provisional application is incorporated by reference for all purposes; and This application claims the benefit of U.S. Provisional Application No. 62/530,026 entitled "TIER-AGNOSTIC META-FILESYSTEM FOR CLOUD-BASED STORAGE" filed Jul. 7, 2017. The provisional application is incorporated by reference for all purposes; and This application claims the benefit of U.S. Provisional Application No. 62/530,028, entitled "EFFICIENT CLONE GENERATION IN A CLOUD-BASED FILE SYSTEM", filed Jul. 7, 2017. The provisional application is incorporated by reference for all purposes; and This application claims the benefit of U.S. Patent Application No. 62/530,031, entitled "COST-AWARE CLOUD FILE SYSTEM FOR CLOUD-BASED STORAGE", filed Jul. 7, 2017. The provisional application is incorporated by reference for all purposes.

FIELD OF THE TECHNOLOGY DISCLOSED

The technology disclosed relates to file system management. In particular, it relates to a STRADL file system with an intermediary file system API that presents to a host system a single interface and translates get, put, and other file system requests into commands compatible with the respective APIs of multiple storage tiers with disjoint file system characteristics.

BACKGROUND

Cloud-based storage platforms like Amazon Web Services™ (AWS), Google Cloud Platform™ (GCP), and Microsoft Azure™ provide convenient, on-demand network access to a shared pool of configurable computing resources (e.g., networks, servers, storage, applications, and services) that can be rapidly provisioned on pay-as-you-go pricing. To accommodate a variety of potential use cases, cloud-based storage platforms offer different storage choices with different media types. Examples of different storage choices include memory, message queues, storage area network (SAN), direct-attached storage (DAS), network attached storage (NAS), databases, and backup and archive. Each of these storage options differ in performance, durability, and cost, as well as in their interfaces. Combinations of storage options form a hierarchy of data storage tiers.

Existing tiered file systems do not have the ability to place an application's primary data across multiple storage tiers with disjoint file system characteristics and different access protocols. For example, a first storage tier may use POSIX-compliant APIs to write data, while a second storage tier may use Amazon S3-like protocol. Moreover, existing tiered file systems use each storage tier for a different purpose. For example, performance tiers like Amazon EBS may be the only tier that hosts an application's primary data; while S3-like tiers store older copies for backups/archive.

We disclose a so-called STRADL file system with an intermediary file system API that presents to a host system a single interface and translates get, put, and other file system requests into commands compatible with the respective APIs of multiple storage tiers with disjoint file system characteristics. The STRADL file system is a tier-aware file system that takes advantage of cost savings associated with the different storage tiers. Based on the performance and budget service level objectives (SLOs) selected by the user and the data access patterns, the STRADL file system tunes placement of data across the different storage tiers.

An opportunity arises to provide highly durable storage across multiple cloud-based storage tiers while reducing runaway costs due to unused resources.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Introduction

Storage is available in tiers of speed and expense. Cheap, slow storage from one cloud storage provider currently costs less than one percent as much as dynamic random access memory (DRAM) memory for the same capacity, but takes a million times as long to access. Cheap memory is provided with high redundancy and consequent reliability and durability, to make it attractive, despite slow access. Unfortunately, the files systems used for cheap, slow memory and faster, more expensive memory tiers are not directly compatible across tiers.

Cost management of storage can be improved by migration of hot and cold data across tiers. Explicit migration across tiers proves cumbersome. Our technology provides automated persistence of data from fast to slow tiers, with unified file access that makes it transparent to users which storage tier actually holds their data. Fast, volatile memory is less reliable for holding data than non-volatile storage with mirroring or other redundancy. So, our technology creates consistency points and periodically persists data from volatile memory to an intermediate, slower non-volatile storage. This intermediate storage is still ten times as expensive as the cheapest (and most reliable) tier of cloud-based storage. So, our technology synchronizes data from the intermediate storage to the cheapest storage. Periodically, relatively stale data is dropped from the volatile memory and even from the intermediate storage. When dropped data is requested, the technology disclosed automatically and transparently reinstates the dropped data from the cheapest storage to the faster tiers, according to some implementations. Persistence from fast to slow tiers with synchronization works better than migration among tiers. The system can trade off speed and cost based on user priorities, without detailed user configuration of the tiers.

The reliability of the volatile and intermediate storage tiers can be further tuned based on user priorities. Suppose that the relative reliability of the storage tiers is two-9s, three-9s and twelve-9s. The volatile memory can be backstopped by a transaction log held in a separate volatile or fast non-volatile memory, effectively increasing reliability from two to four-9s. The intermediate tier can be mirrored, giving six-9s reliability. The system can transparently implement user requested supplemental reliability measures. More details are revealed below.

Environment

We disclose systems, methods, and articles of manufacture that transparently provide the reliability of a highly reliable non-volatile storage tier with the performance of a volatile storage tier in multi-tier cloud-based storage platforms.

Figure 1:
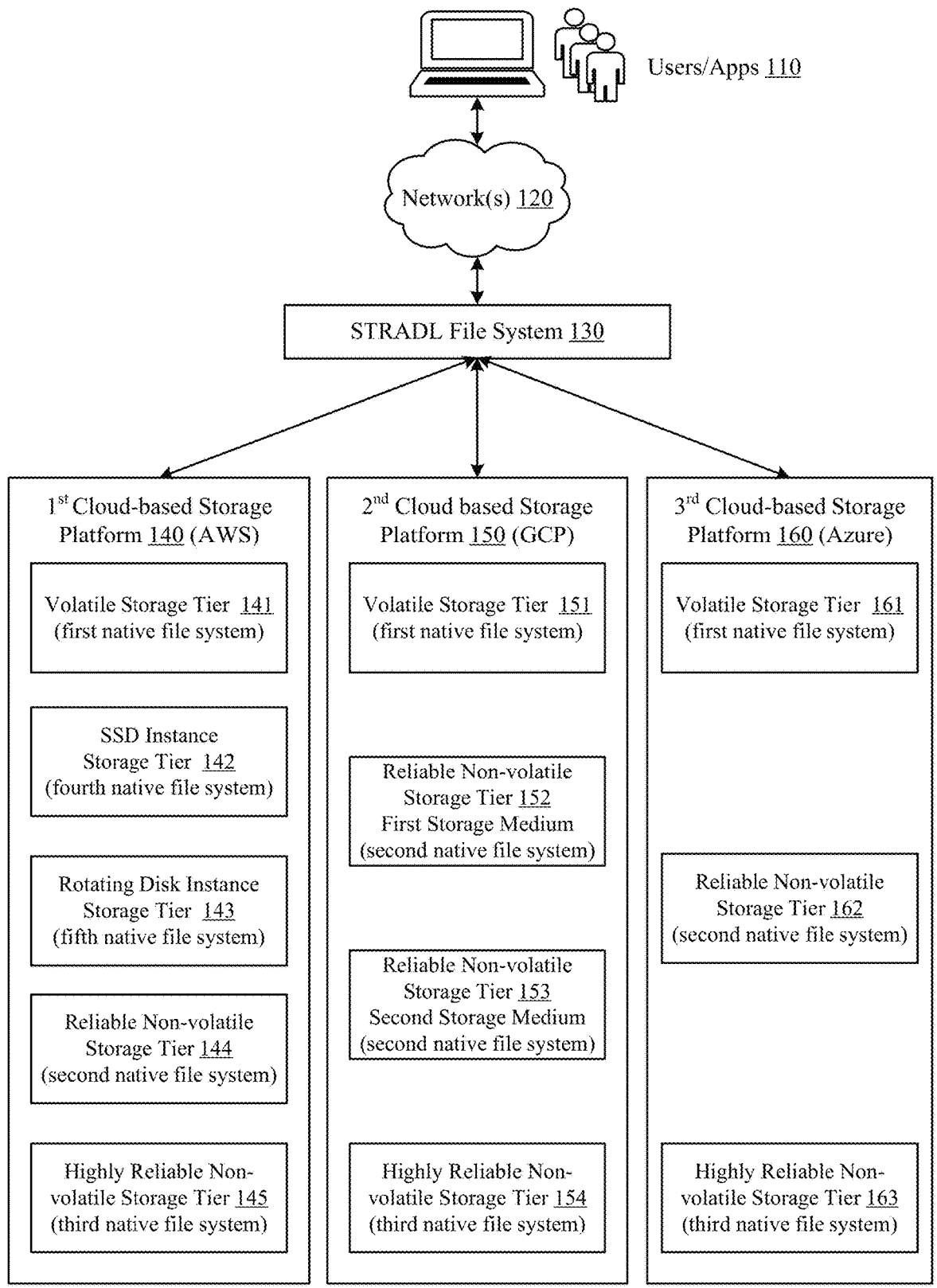
FIG. 1 illustrates a block diagram of an example environment in which the disclosed STRADL file system transparently deploys file blocks across multiple storage tiers of different cloud-based storage platforms.

FIG. 1 shows an architectural level schematic of an example environment 100 in which the technology disclosed can be used. Because FIG. 1 is an architectural diagram, some details are omitted to improve clarity. The discussion of FIG. 1 will be organized as follows. First, the elements of the figure will be described, followed by their interconnections. Then, the use of the elements in the system will be described in greater detail.

Environment 100 includes a cloud-based STRADL file system 130 which transparently deploys file blocks across multiple storage tiers of different cloud-based storage platforms. See the discussion of FIG. 3 for additional example modules of the STRADL file system 130. Users 110 can use network(s) 120 to interact with the STRADL file system 130 via applications (cloud-based or enterprise) running on their computing devices. Applications can be software-as-a-service (SaaS) offerings such as Google Apps™, Facebook™, YouTube™, and Salesforce.com™.

The STRADL file system 130 provides a STRADL application programming interface (API) that transparently communicates with multiple tiers of different cloud-based storage platforms. STRADL API is a source code-based application intended to be used as an interface by software components to communicate with each other. STRADL API contains packaged collection of code libraries, routines, protocol methods, variables, and fields that belong to a set of classes, including its interface types. STRADL API can provide functionality via one or more protocols, such as web service APIs like representational State Transfer (REST) or Simple Object Access Protocol (SOAP) or Remote Procedure Call (RPC) interfaces with Extensible Markup Language (XML) or Javascript Object Notation (JSON) formats of data, websocket APIs, object remoting APIs like CORBA or .NET Remoting, library-based APIs like JavaScript or TWAIN, class-based APIs like Java API or Android API, and hardware APIs video acceleration, hard disk drives, or PCI buses. STRADL API specification can take many forms, such as Portable Operating System Interface (POSIX), Web Real-Time Communication (WebRTC), Hypertext Transfer Protocol (HTTP), and Microsoft Windows API.

Cloud-based storage platforms provide cloud-based computation, storage, and other functionality that enable organizations and individuals to deploy applications and services on an on-demand basis and at commodity prices. FIG. 1 shows three example cloud-based storage platforms 140, 150, and 160 offered by three different cloud computing platform providers, namely Amazon Web Services™ (AWS), Google Cloud Platform™ (GCP), and Microsoft Azure™, however, it is understood that environment 100 can include any number of cloud-based storage platforms, and is not limited to these vendors.

To accommodate a variety of potential use cases, cloud-based storage platforms offer different storage choices with different media types. Examples of different storage choices include memory, message queues, storage area network (SAN), direct-attached storage (DAS), network attached storage (NAS), databases, and backup and archive. Each of these storage options differ in performance, durability, and cost, as well as in their interfaces. Combinations of storage options form a hierarchy of data storage tiers.

AWS offers multiple cloud-based storage tiers. Each tier has a unique combination of performance, durability, availability, cost, and interface, as well as other characteristics such as file systems and APIs. AWS also offers an on-demand cloud computing platform called Elastic Compute Cloud™ (EC2), which allows users 110 to create and run compute instances on AWS. EC2 instances use familiar operating systems like Linux, Windows, or OpenSolaris. Users 110 can select an instance type based on amount and type of memory and computing power needed for the application or software they plan to run on the EC2 instance. The different AWS storage tiers are made accessible through EC2. Some examples of AWS storage tiers accessible via EC2 are Amazon Simple Storage Service™ (S3) (scalable storage in the cloud), Amazon Glacier™ (low-cost archive storage in the cloud), Amazon Elastic Block Storage™ (EBS) (persistent block storage volumes for Amazon EC2 virtual machines), Amazon EC2 Instance Storage™ (temporary block storage volumes for Amazon EC2 virtual machines), Amazon ElastiCache™ (in-memory caching service), AWS Import/Export™ (large volume data transfer), AWS Storage Gateway™ (on-premises connector to cloud storage), Amazon CloudFront™ (global content delivery network (CDN)), Amazon SQS™ (message queue service), Amazon RDS™ (managed relational database server for MySQL, Oracle, and Microsoft SQL Server), Amazon DynamoDB™ (fast, predictable, highly-scalable NoSQL data store), Amazon Redshift™ (Fast, powerful, full-managed, petabyte-scale data warehouse service), and databases on Amazon EC2™ (self-managed database on an Amazon EC2 instance). For additional information about different storage options and tiers offered by AWS, reference can be made to J. Baron and S. Kotecha, "Storage options in the AWS cloud," Amazon Web Services, Washington D.C., Tech. Rep., October 2013, which is incorporated by reference for all purposes as if fully set forth herein.

In FIG. 1, five example AWS storage tiers are illustrated as blocks 141-145, i.e., volatile storage tier 141, solid-state drive (SSD) instance storage tier 142, rotating disk instance storage tier 143, reliable non-volatile storage tier 144, and highly reliable non-volatile storage tier 145. Volatile storage tier 141 represents the in-memory storage of an EC2 instance, such as file caches, object caches, in-memory databases, and random access memory (RAM) disks. Volatile storage tier 141 has a first native file system that is an in-memory file system suitable for providing rapid access to data. Examples of first native file system are Apache Ignite™ and temporary file storage facility (tmpfs). Volatile storage tier 141 improves the performance of cloud-based applications by allowing data retrieval from fast, managed, in-memory caches, instead of slower disk-based databases.

Although volatile storage tier 141 is the fastest storage tier, it has the least durability and reliability of 99.9% (three nines), making it is suitable for temporary storage such as scratch disks, buffers, queues, and caches. EC2 local instance store volumes, Amazon SQS™, Amazon ElastiCache™ (Memcached or Redis) are some examples of AWS offerings under the volatile storage tier 141.

AWS offers ephemeral storage called instance tier that is physically attached to an EC2 instance. The ephemeral storage uses either rotating disks or solid-state drives (SSDs). SSD volumes can be non-volatile memory express (NVMe) based or SATA based. Ephemeral storage can also be redundant array of independent disks (RAID) configured to improve performance.

The illustrated SSD instance storage tier 142 is implemented as AWS ephemeral storage that uses SSDs as a storage medium and provides temporary block-level storage for an EC2 instance. This tier comprises a preconfigured and pre-attached block of disk storage on the same physical server that hosts the EC2 instance. SSD instance storage tier 142 has a fourth native file system that is very fast and typically best for sequential access. SSD instance storage tier 142 is optimized for high sequential input/output (I/O) performance across very large datasets. Example applications include NoSQL databases like Cassandra™ and MongoDB™ data warehouses, Hadoop™ storage nodes, seismic analysis, and cluster file systems.

While SSD instance storage tier 142 is best for temporary storage of information that is continually changing, such as buffers, scratch data, and other temporary content, or for data that is replicated across a fleet of instances, such as load-balanced pool of web servers, it is not intended to be used as durable disk storage. The SSD instance storage tier 142 has a rated durability of 99.99% (four nines), approximately. Data on this tier persists only during the life of the associate EC2 instance. Data on this tier is persistent across orderly instance reboots, but if the EC2 instance is stopped and re-started, terminates, or fails, all data on this tier is lost.

Rotating disk instance storage tier 143 is implemented as AWS ephemeral storage that uses hard disk drives (HDDs) as a storage medium and has a fifth native file system. Throughput-Optimized HDD™ and Cold HDD™ are examples of HDD volume types offered by AWS. Throughput-Optimized HDD™ volumes are low-cost HDD volumes designed for frequent-access, throughput-intensive workloads such as big data, data warehouses, and log processing. These volumes are significantly less expensive than SSD volumes. Cold HDD™ volumes are designed for less frequently accessed workloads such as colder data requiring fewer scans per day. Cold HDD™ volumes are significantly less expensive than Throughput-Optimized HDD™ volumes.

Reliable non-volatile storage tier 144 is implemented as AWS Elastic Block Store™ (EBS) with a second native file system. This implementation provides block level storage volumes for use with EC2 instances. This implementation provides EBS volumes that are off-instance, network-attached storage (NAS) persisting independently from the running life of an EC2 instance. After an EBS volume is mounted to an EC2 instance, it can be used as a physical hard drive, typically by formatting it with the native file system of choice and using the file I/O interface provided by the EC2 instance operating system. There is no AWS data API for EBS. Instead, EBS presents a block-device interface to the EC2 instance. That is, to the EC2 instance, an EBS volume appears just like a local disk drive. To write to and read data from reliable non-volatile storage tier 144, the native file system I/O interfaces of the chosen operating system are used.

Reliable non-volatile storage tier 144 is designed to be highly available and reliable. Although it is slower than the volatile storage tier 141 and the instance tiers 142 and 143, it provides higher rated reliability of 99.9999% (six nines), approximately. Reliable non-volatile storage tier 144 is meant for data that changes relatively frequently and requires long-term persistence. It is often used as the primary storage for a database or file system, or for any applications that require access to raw block-level storage.

Highly reliable non-volatile storage tier 145 depicts an example AWS Amazon Simple Storage Service™ (S3) with a third native file system. This tier provides object level storage with a web service interface to store and retrieve huge amounts of data at very low costs and high latency. It delivers the highest level of rated durability of 99.999999999% (eleven nines), approxmimately.

S3 provides standards-based REST and SOAP web services APIs for both management and data operations. These APIs allow S3 objects (files) to be stored in uniquely-named buckets (top-level folders). Buckets are a simple flat folder with no file system hierarchy. Each object can have a unique object key (file name) that serves as an identifier for the object within that bucket.

The third native file system of S3 is an object-based file system that operates on the whole object at once, instead of incrementally updating portions of the objects. The third native file system uses a PUT command to write objects into S3, a GET command to read objects from S3, a DELETE command to delete objects, a POST command to add objects using HyperText Markup Language (HTML) forms, and a HEAD command to return an object's metadata but not the data itself. In other implementations, a file system hierarchy (e.g., folder1/folder2/file) can also be emulated in S3 by creating object key names that correspond to the full path name of each file.

FIG. 1 also shows four examples of Google Cloud Platform™ (GCP) storage tiers as blocks 151-154. This includes volatile storage tier 151, reliable non-volatile storage tier 152 with a first storage medium, reliable non-volatile storage tier 153 with a second storage medium, and highly reliable non-volatile storage tier 154. GCP allows users 110 to create scalable virtual machines. Each virtual machine has access to memory in volatile storage tier 151 hosting a first native filesystem. The reliable non-volatile storage tier 152 offers persistent storage of data on a first storage medium (e.g., NVMe SSDs). This storage tier hosts a second native file system. The reliable non-volatile storage tier 153 also hosts the second native file system but offers persistent storage of data on a second storage medium (Seq. HDD). The highly reliable non-volatile storage tier 154 is an object store hosting a third native file system.

FIG. 1 further illustrates three example Microsoft Azure™ (Azure) storage tiers as blocks 161-163, i.e., volatile storage tier 161, reliable non-volatile storage tier 162, and highly reliable non-volatile storage tier 163. For online transactional processing (OLTP), online analytical processing (OLAP), and hybrid transaction/analytical processing (HTAP), Azure allows users 110 to optimize performance using in-memory storage of volatile storage tier 161 that hosts a first native file system. The reliable non-volatile storage tier 162 provides persistent storage of data using a block storage scheme and hosts a second native file system. The highly reliable non-volatile storage tier 163 provides object storage by storing data as blobs inside containers and hosts a third native file system.

System Overview

Figure 2:
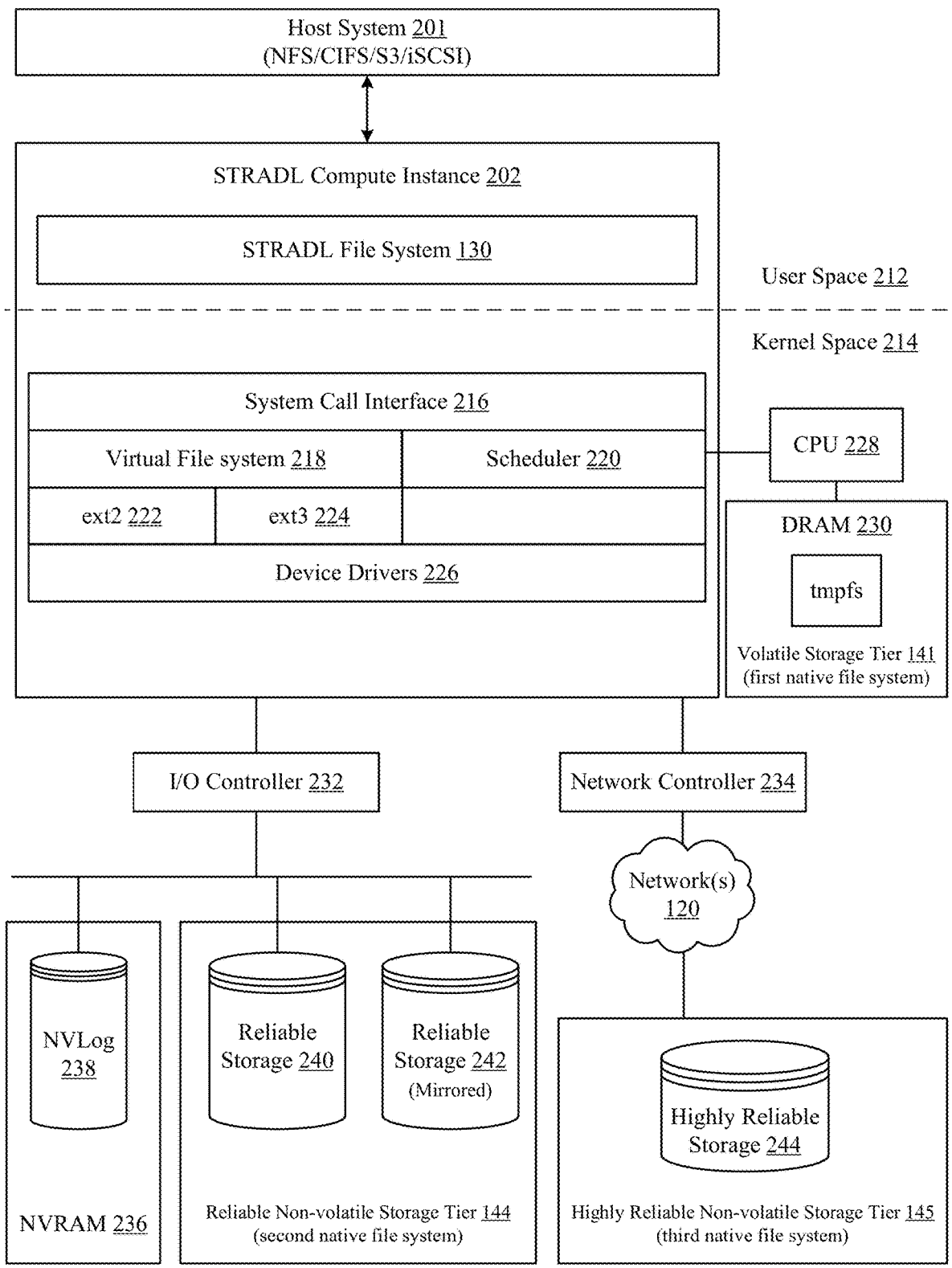
FIG. 2 depicts one implementation in which the disclosed STRADL file system presents to a host system a single interface across multiple storage tiers with disjoint file system characteristics.

FIG. 2 depicts one implementation in which the disclosed STRADL file system 130 presents to a host system 201 a single interface across multiple storage tiers with disjoint file system characteristics. In system 200, host system 201 can run a virtual machine such an AWS EC2 instance. The host system 201 mounts a storage device, a network file system (NFS) or communicates to a remote storage such as Amazon S3 object storage. The STRADL file system 130 executes in user space 212 of the STRADL compute instance 202 which in turn may execute on an AWS EC2 instance. In other implementations, the STRADL file system 130 can also execute in the kernel space 214. The STRADL file system 130 uses a system call interface 216 to communicate with virtual file system 218, which in turn interacts with one or more file systems like ext2 222 or ext3 224. A scheduler 220 is also in communication with the system call interface 216 to schedule tasks for execution by central processing unit (CPU) 228.

The STRADL file system 130 uses an intermediary file system API that presents to the host system 201 a single interface for accessing different underlying storage tiers. The STRADL file system 130 translates get, put, and other file system requests received via different access protocols into commands compatible with the underlying storage tiers, without host system awareness of which of the multiple tiers holds requested data and metadata.

Multi-Protocol Access

The STRADL file system 130 provides multi-protocol access. Unlike traditional file systems in which users are committed to a single data access protocol, the STRADL file system 130 allows users to access the same data volume via different access protocols. Examples of different access protocols include network file system (NFS) protocol, common internet file system (CIFS) protocol, representational state transfer (REST) protocol, internet small computer systems interface (iSCSI) protocol, server message block (SMB) protocol, file transfer protocol (FTP) protocol, cloud data management interface (CDMI) protocol, and apple filing protocol (AFP) protocol. For example, the STRADL file system 130 can write data using S3 REST protocol and can read data using NFS protocol.

STRADL's multi-protocol access can be useful for a variety of use cases. Consider big data scenarios where the STRADL file system 130 streams internet-of-things (IOT) data from a Kafka plugin using S3 protocol. Later, the STRADL file system 130 can make this data available to an analysis engine that uses NFS protocol. In another example, a backup agent running on an on-premise environment can send backup data streams from virtual machine disks (vmdks) or logical unit numbers (LUNs) to the STRADL file system 130 using S3 protocol. Later, the vmdks or the LUNs can be accessed through the STRADL file system 130 over iSCSI protocol for reusing the data in cloud applications.

Cost Awareness

The STRADL file system 130 is a tier-aware file system that takes advantage of cost savings associated with the different storage tiers. Based on the performance and budget service level objectives (SLOs) mapped to a cost optimization policy selected by the user and data access patterns, the STRADL file system 130 tunes placement of data across the different storage tiers. In addition, the data placement is automatic and transparent to the user. That is, the user just selects the desired cost optimization policy and the STRADL file system 130 selects the set of storage tiers and the media (e.g., SSD, HDD, Seq. HDD,) for each tier that are most suitable for meeting the SLOs mapped to the cost optimization policy. In implementations, the user can also set the SLOs. The STRADL file system 130 also takes into account cost metrics associated with each underlying storage tier and makes the optimal decisions with respect to data placement and access. In addition to the storage cost, the STRADL file system 130 further takes into the I/O cost such as the cost of PUTs and GETs.

The STRADL file system 130 can be configured to operate according to high-level cost optimization policies selected by the user. The selection can be received from a management portal or a REST API. Examples of cost optimization policies include a platinum policy, a gold policy, a silver policy, and a bronze policy. A cost optimization policy maps to one or more SLOs, including budget SLOs, cost SLOs, performance SLOs, health SLOs, data protection SLOs, and cloning SLOs. The STRADL file system 130 automatically determining storage parameters that meet the SLOs based at least on cost metrics and storage characteristics of multiple storage. Examples of storage parameters include number of storage tiers, type of the storage tiers, media-type of the storage tiers, size of the storage tiers, time intervals between commit operations, time intervals between synchronization operations, size of the read cache, and size of the write cache. Examples of cost metrics include cost of storing data in a storage tier, i.e., storage cost, cost of writing data to a storage tier, i.e., transmission cost, and cost of reading data from a storage tier, i.e., access cost. Examples of storage characteristics include reliability and durability of a storage tier, i.e., durability characteristics, latency, throughout, and input/output operations per second (IOPS) of a storage tier, i.e., performance characteristics, and deduplication and compression functionalities of a storage tier, i.e., efficiency characteristics.

The STRADL file system 130 stores data across multiple storage tiers in accordance with the computed storage parameters and makes the stored data available via the intermediary file system API. FIG. 2 shows examples of different underlying storage tiers in which the STRADL file system 130 can store an application's primary data and whose different access protocols the STRADL file system 130 can abstract from the host system 201 using its intermediary file system API. Example storage tiers include dynamic random access memory (DRAM) 230, non-volatile log (NVLog) 238, reliable storage 240 and mirrored reliable storage 242, and highly reliable storage 244.

DRAM 230 serves as volatile storage in the volatile storage (VS) tier 141 that hosts the first native file system as its access protocol. The first native file system can be tmpfs, a commonly used in-memory file system. In other implementations, volatile storage tier 141 can host other in-memory file systems such as Apache Ignite™.

The STRADL file system 130 communicates with reliable storage 240 via device drivers 226 and I/O controller 232. Reliable storage 240 is located in the reliable non-volatile storage (RNVS) tier 144 that hosts a second native file system as its access protocol (e.g., ntfs, nfs, ext2, ext3, ext4, exfat, and fat32). The STRADL file system 130 receives and responds to various read and write requests from the cloud-based applications. Because system 200 handles large volumes of client requests, it may be impractical to save data modifications to the non-volatile storage tiers 144 and 145 every time a write request is received from a client. The reason is that disk accesses tend to take a relatively long time compared to solid state memory accesses. Therefore, the STRADL file system 130 can instead hold write requests in memory temporarily and only periodically save the modified data to the reliable non-volatile storage tier 144, such as every 5 to 10 seconds. The event of saving the modified data to the reliable non-volatile storage tier 144 is called a "consistency point" (CP). At a consistency point, the STRADL file system 130 saves any data that was modified by the write requests to primary reliable storage 240 and also triggers a process of updating the data stored at the secondary reliable storage 242 to mirror the data stored at the primary reliable storage 240.

Non-volatile random access memory (NVRAM) 236 maintains a log of write requests received from clients since the last consistency point. This log is referred to as the non-volatile log (NVLog) 238. The NVLog 238 includes a separate entry for each write request received from a client since the last consistency point. Each NVLog entry includes the data to be written according to the corresponding request. The NVLog 238 is used in the event of a failure, to recover data that would otherwise be lost. In the event of a failure, it may be possible to replay the NVLog 238 to reconstruct the current state of stored data just prior to the failure. After each consistency point is completed, the NVLog 238 is cleared of data for that consistency point.

The STRADL file system 130 communicates with highly reliable storage 244 in the highly reliable non-volatile storage (HRNVS) tier 145 through network controller 234 and network 120. The HRNVS tier 145 hosts a third native file system as its access protocol (e.g., REST API, s3fs, objectiveFS). After the data is stored at the reliable storage 240, the STRADL file system 130 synchronizes the data to the highly reliable storage 244. The process of synchronizing the data at the highly reliable storage 244 is called a "durable snapshot".

The following table shows one example of the STRADL file system 130 automatically determining storage parameters for a platinum policy and storing data across the following storage tiers—memory tier, instance tier, EBS tier with SSD media-type, EBS tier with HDD media-type, and S3 tier. In the table below, "x" denotes the $/GB cost of the cheapest and most reliable storage tier, namely S3 tier. The multiplier "n" represents the cost of mirrored storage. "V. High", "High", "Medium", and "Low" represent how much storage is used at each tier for a typical data set. Since all data is eventually synchronized at the cheapest and most reliable tier (e.g., S3 tier) and the higher tiers serve primarily as caches, "All Data" represents eventual synchronization.

| Policy | Memory (20x) | Instance (4x) | EBS SSD (8x) | EBS HDD (4x) | S3 (x) | Overall $ cost | Storage Task |
|---|---|---|---|---|---|---|---|
| Platinum | V. High | V. High | V. High | — | All Data | $$$$ | OLTP & RDBMS |
| Gold | High | Low | High | — | All Data | $$$ | DevOps & no-SQL DBs |
| Silver | Medium | Low | — | Low | All Data | $$ | Analytics/DevOps |
| Bronze | Medium | — | — | Low | All Data | $ | Backup/Streaming/Big-data |

In the table above, for an online transaction processing (OLTP) storage task, OLTP's latency requirements are best served by a platinum policy, according to one example. Since OLTP applications require very high performance and low latency, the platinum policy procures V. High write/read cache over a fast reliable EBS SSD, V. High memory tier, and an additional V. High read cache over instance tier.

Also in the table above, for a backup/streaming/big data storage task, a bronze policy is best served, according to one example. Bronze policy procures a medium sized memory tier and a low write/read cache on a HDD based reliable medium.

Figure 3:
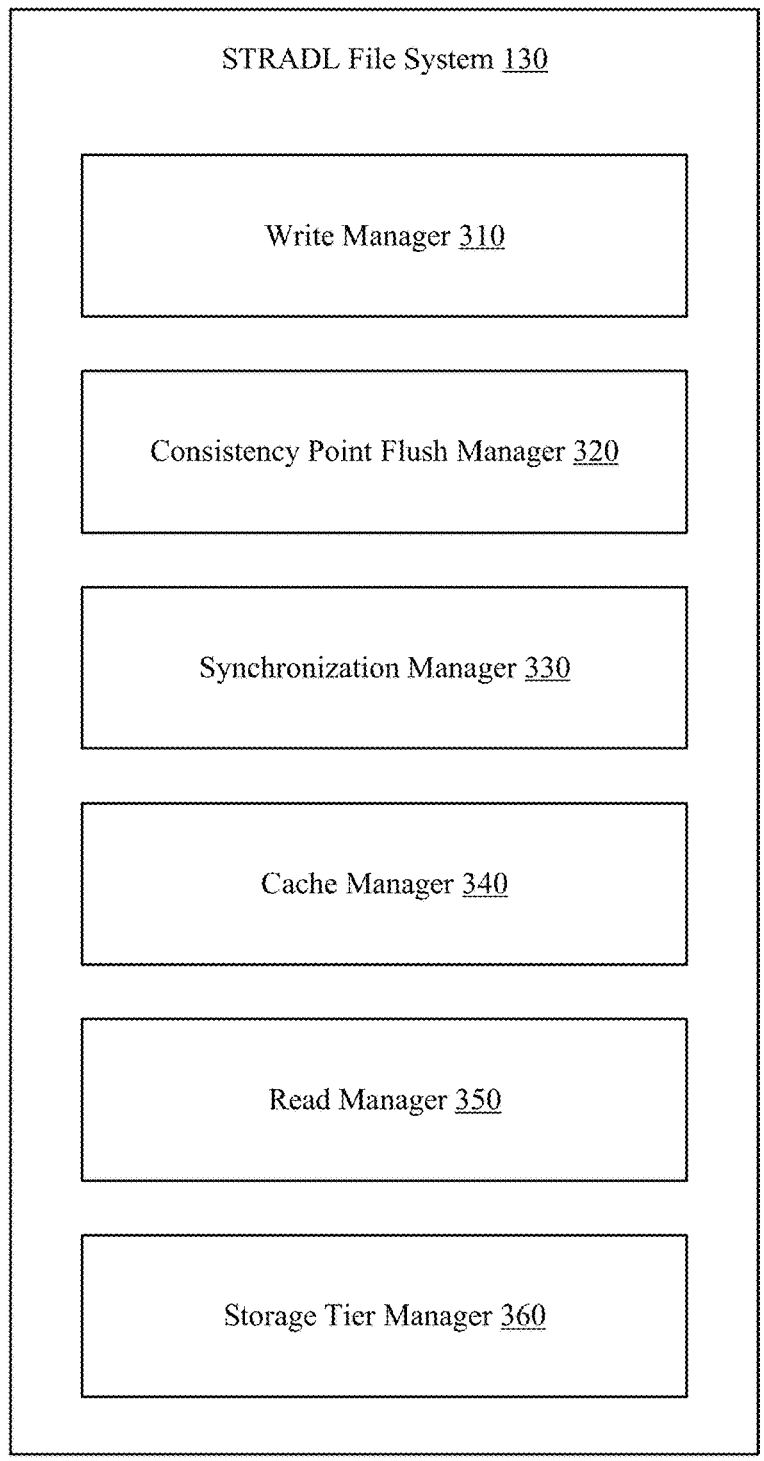
FIG. 3 is a schematic block diagram of example STRADL file system modules.

FIG. 3 is a block diagram of example STRADL file system modules 300. FIG. 3 includes a write manager 310, a consistency point flush manager 320, synchronization manager 330, a cache manager 340, a read manager 350, and a storage tier manager 360. In other implementations, the STRADL file system 130 can include additional or fewer modules than shown in FIG. 3.

Message Sequence Diagrams

Figure 4:
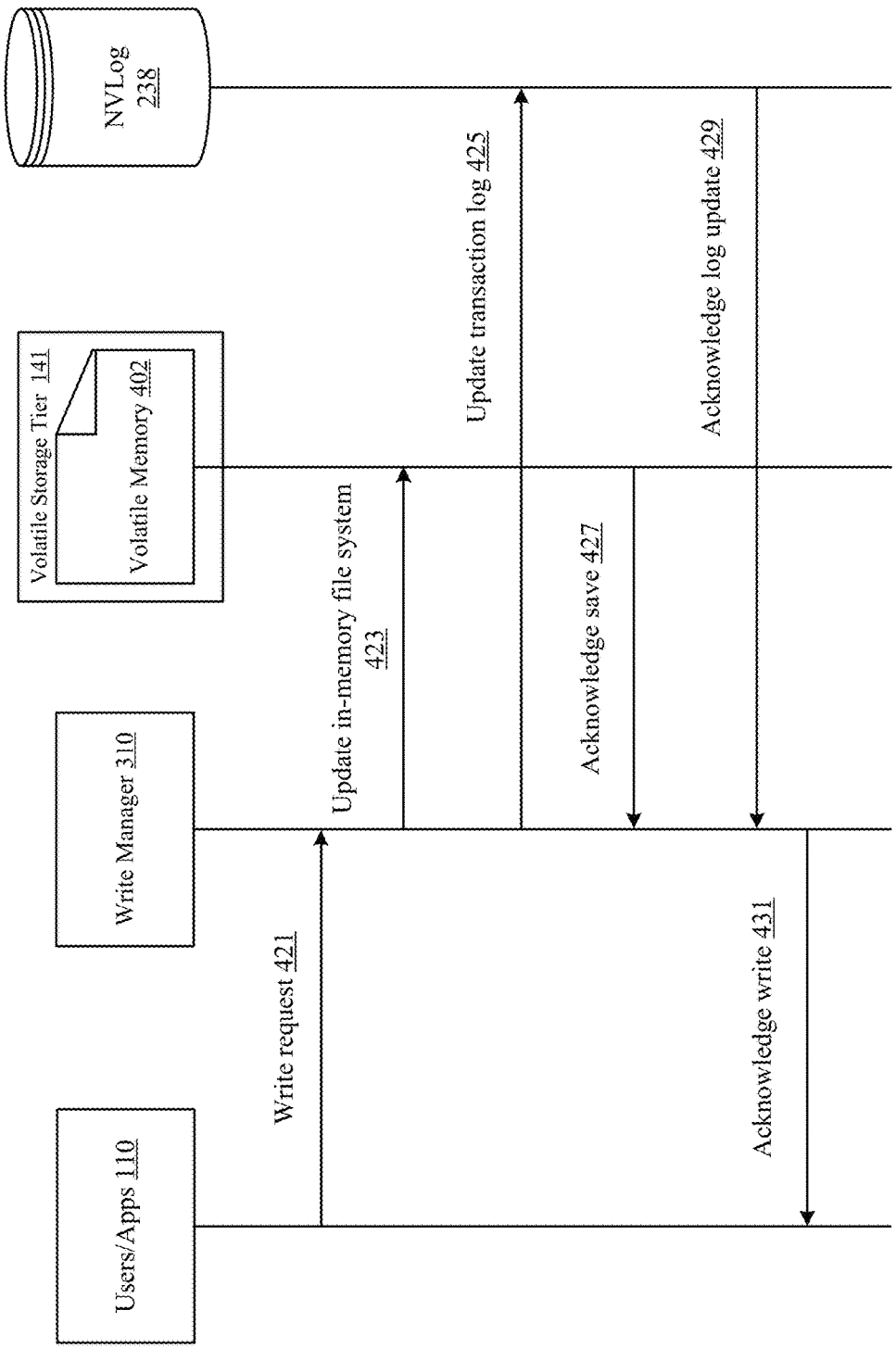
FIG. 4 is an example message sequence diagram in which the disclosed STRADL file system processes an incoming write request.

FIG. 4 shows communication between the user/apps 110, the write manager 310, a volatile memory 402 in the volatile storage tier 141, and the NVLog storage 238 as a message sequence diagram 400. Other implementations may perform the exchanges in different orders and/or with different, fewer, or additional exchanges than the ones illustrated in FIG. 4. For convenience, the sequence diagram is described with reference to the system that carries out a method. The system is not necessarily part of the method.

The message sequence diagram 400 shows communication between the various actors when the STRADL file system 130 processes an incoming write request. A write request message 421 is sent by the user 110 running a client application to the write manager 310 via the intermediary file system API of the STRADL file system 130 and destined for a file. The write manager 421 sends a message "update in-memory file system" 423 to the volatile memory 402 in the VS tier 141 and marks it to be committed to the RNVS tier. In parallel, the write manager 310 sends an "update transaction log" message 425 to NVLog storage 238. In response, the VS tier 141 sends an "acknowledge save" message 427 to the write manager 310 after completing the data write operation to volatile memory 402. The NVLog 238 sends an "acknowledge log update" message 429 to the write manager 310 after completing the write operation to the NVLog storage 238. It may be the case that NVLog 238 completes the write operation before the write operation to the volatile memory 402 is completed, or vice-versa. However, until it has received both acknowledge messages 427 and 429, the write manager 310 does not initiate dispatching of acknowledge write message 431 to the user 110.

Figure 5:
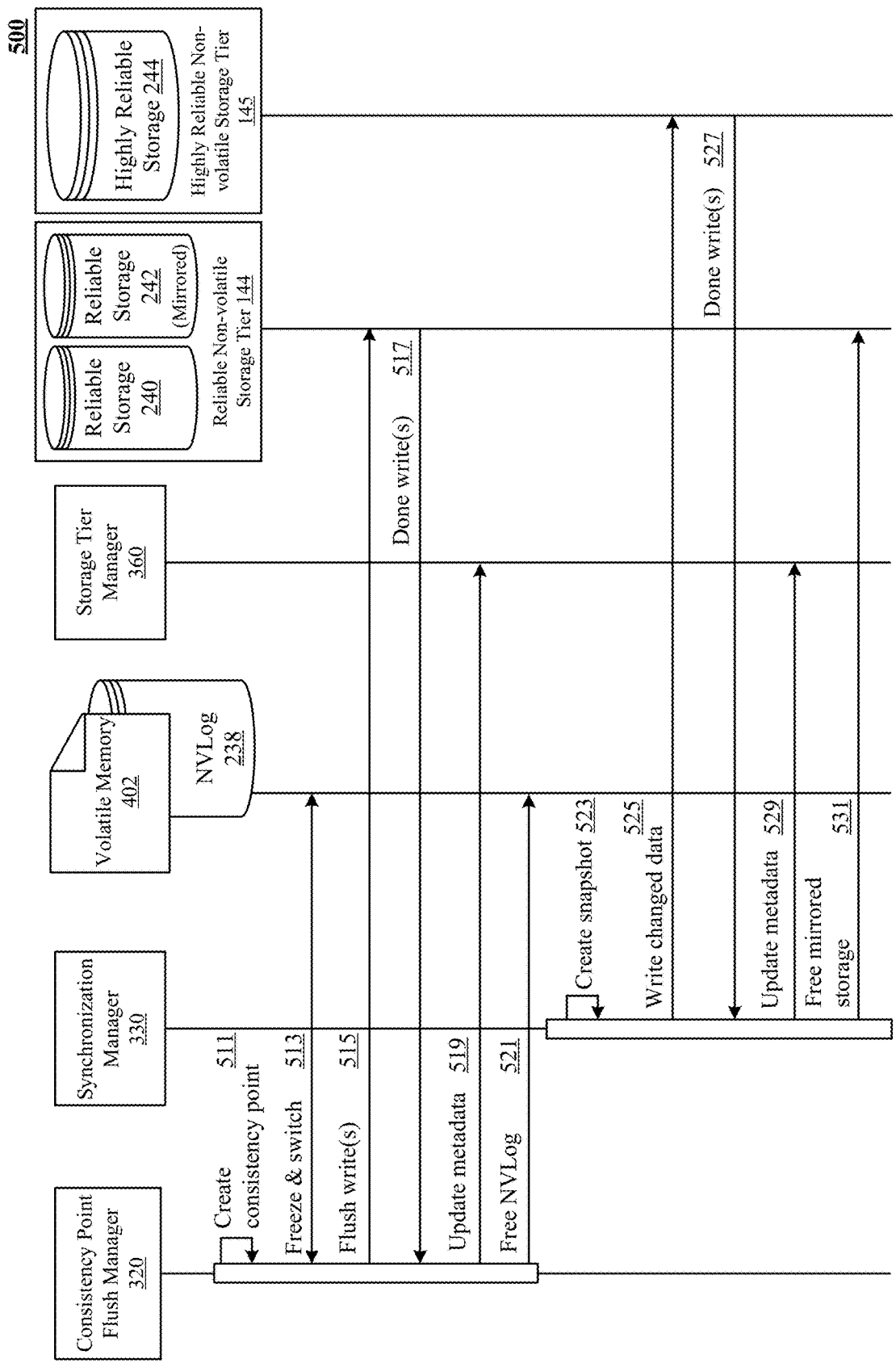
FIG. 5 is an example message sequence diagram illustrating consistency point and durable snapshot operations of the disclosed STRADL file system.

FIG. 5 is an example message sequence diagram 500 that builds on the write operation of STRADL file system 130 described in FIG. 4. Diagram 500 shows communication between the consistency point flush manager 320, the synchronization manager 330, the volatile memory 402, the NVLog 238, the storage tier manager 360, the RNVS tier 144 comprising the reliable storage 238 and the mirrored storage 242, and the HRNVS tier 145 comprising the highly reliable storage 242. Other implementations may perform the exchanges in different orders and/or with different, fewer, or additional exchanges than the ones illustrated in FIG. 5. For convenience, the sequence diagram is described with reference to the system that carries out a method. The system is not necessarily part of the method.

The consistency point flush manager 320 periodically commits data from the VS tier 141 to the RNVS tier 144 by creating consistency point (CP) of the file system view in the VS tier 141. The CP creation operation is initiated by "create consistency point" message 511. STRADL file system 130 maintains two separate regions NVLog 238 to save incoming write operations. When storage space in a first region of the NVLog 238 is full, the the consistency point flush manager 320 freezes data in VS tier 141 and the NVLog 238 via a "freeze and switch message" 513. This creates a CP of the STRADL file system 130 in the VS tier 141. The consistency point flush manager receives an acknowledgement of data freeze in the first region of NVLog and performs subsequent write operations on a second region of the NVLog 238. By keeping two regions in NVLog for logging write transactions, the STRADL file system 130 avoids latencies in write operations to NVLog while the current CP is being copied to a next storage tier. The consistency point flush manager 320 copies data that has changed between CPs in the VS tier 141 to the RNVS tier 144 via a "flush write(s)" message 515. The consistency point flush manager 320 receives an acknowledgement via "done write(s)" message 517 from RNVS tier 144 after the CP is committed to the reliable storage 240 in the RNVS tier 144.

In some implementations, the data in reliable storage 240 is mirrored at the reliable storage 242 in the RNVS tier 144 to increase the reliability. In such implementations, the CP is also committed to the mirrored reliable storage 242. The "done write(s)" message 517 is sent from the RNVS tier 144 to the consistency point flush manager 320 after data is reliably committed to both the reliable storage 240 and the mirrored reliable storage 242. The consistency point flush manager 320 updates the STRADL file system 130 metadata by sending "update metadata" message 519 to the storage tier manager 360. Following this, the consistency point flush manager 320 sends "free NVLog" message 521 to NVLog 238 to delete transactional data stored for the recently committed CP. This data is not required in NVLog 238 for failure recovery because the changed data is now written to RNVS tier 144.

The synchronization manager 330 periodically synchronizes data from the RNVS tier 144 to the HRNVS 145 by creating durable snapshots. The process is initiated with a "create snapshot" message 523. The synchronization manager copies the changed data in the reliable storage 240 in RNVS tier 144 from a prior durable snapshot to highly reliable storage 244 in the HRNVS tier 145 via a "write changed data" message 525. After receiving the "done write(s)" message 527 from the HRNVS tier 145, the synchronization manager 330 updates the STRADL file system 130 metadata by sending "update metadata" message 529 to the storage tier manager 360. Following the metadata update, the synchronization manager 330 demirrors the redundant data from reliable storage 242 in the RNVS tier 144 via a "free mirrored storage" message 531.

Storage Tiers

Figure 6:
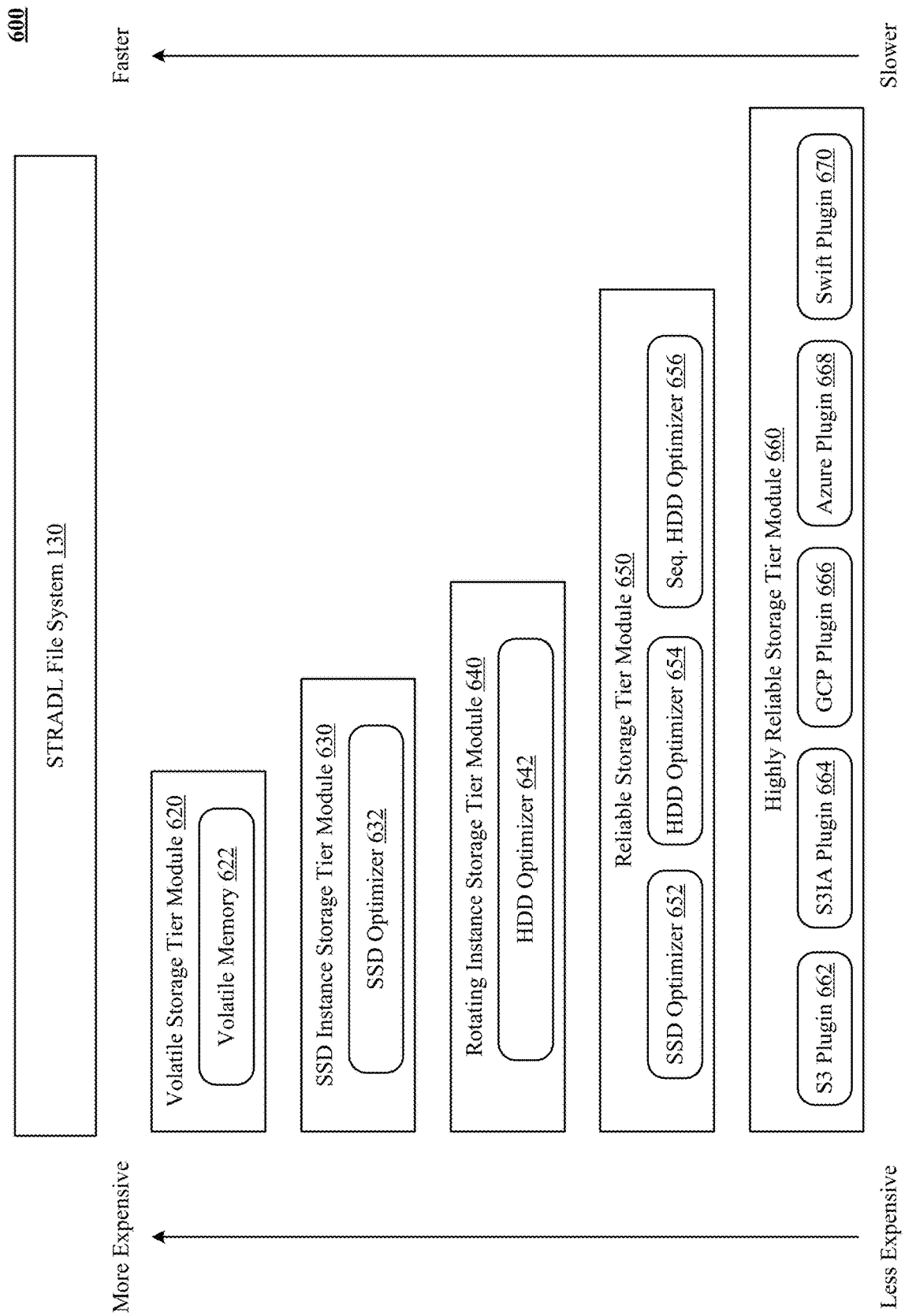
FIG. 6 illustrates examples of different storage media of multiple storage tiers with which the disclosed STRADL file system interfaces.

FIG. 6 shows examples of different storage media in five storage tiers with which the STRADL file system 130 interfaces. In FIG. 6, the more expensive and faster storage tiers are positioned at the top. The volatile storage tier module 620 interfaces with the VS tier 141 through a volatile memory interface 622. The SSD instance storage tier module interfaces with SSD instance storage tier 142 via a SSD optimizer interface 632. The rotating instance storage tier module 640 communicates with the rotating disk instance storage tier 143 via a HDD optimizer interface 642.

The reliable storage tier module 650 communicates with the RVNS tier 144 via three different interfaces, each optimized to the specific type of storage medium in the RNVS tier 144. The SSD optimizer interface 632 is used for read or write operations to the SSD type storage medium. The HDD optimizer interface is used for read or write operations to the HDD type storage medium. The sequential HDD optimizer interface 652 is used to read or write data in a sequential manner (e.g., for video recording data).

The highly reliable storage tier module 660 contains plugins for various types of cloud-based storage services in the HRNVS tiers 145, 154 and 163. It has a S3 plugin 662, a S3IA plugin 664, a GCP plugin 666, an Azure plugin 668 and a swift plugin 670.

Write and Read Caches

Figure 7:
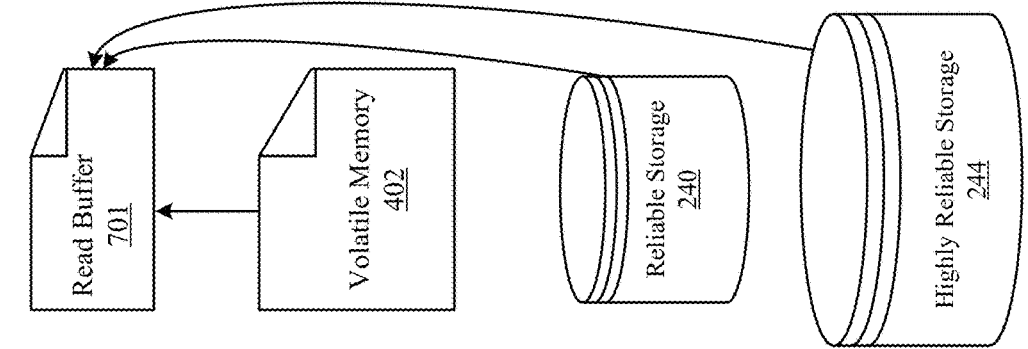
FIG. 7 shows an example of how the disclosed STRADL file system contrastingly implements a write operation flow, a read cache expiration flow, and a read operation flow.
Figure 7:
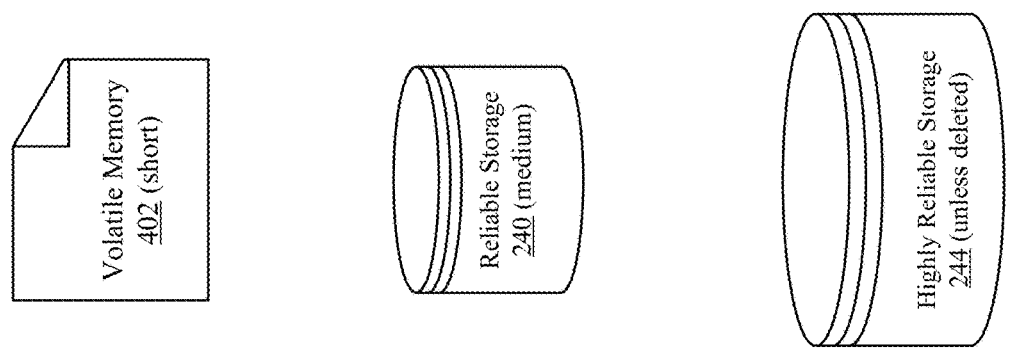
Figure 7:
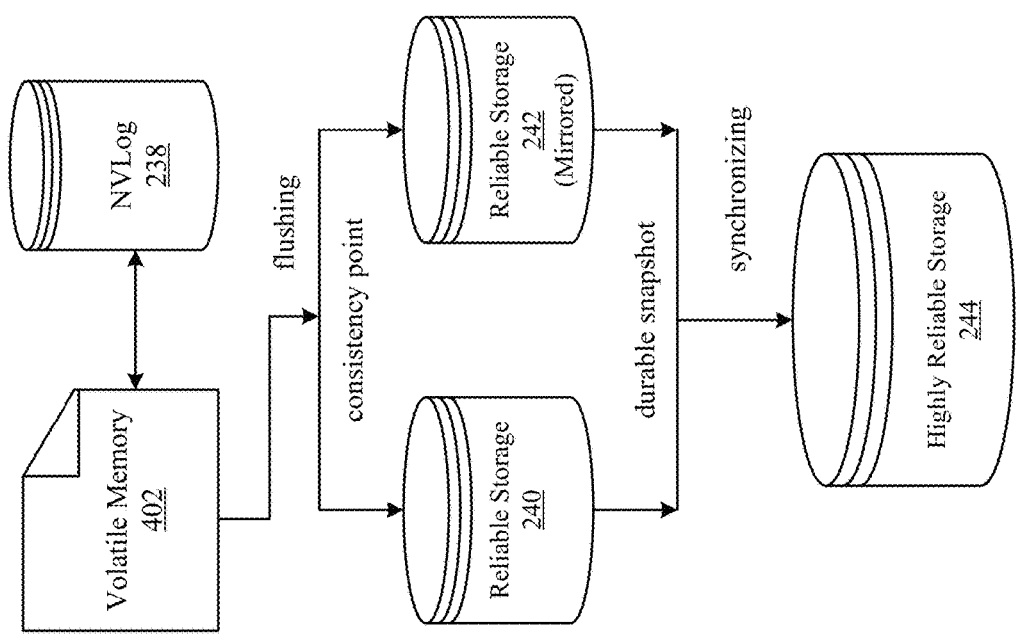

FIG. 7 shows an example 700 of how the disclosed STRADL file system 130 contrastingly implements a write operation flow 710, a read cache expiration flow 720, and a read operation flow 730.

In the write operation flow 710, the STRADL file system 130 simultaneously writes data, received via the intermediary file system API and destined for a file, to the volatile memory 402 of the VS tier and the NVLog 238, and marks it to be committed to the reliable non-volatile storage tier 144. At each consistency point, the STRADL file system 130 then periodically flushes data from the VS tier to the RNVS tier comprising the reliable storage 240 and the mirrored reliable storage 242. At each durable snapshot, the STRADL file system 130 synchronizes data from the RNVS tier to the HRS tier comprising high reliable storage 244.

In the read cache expiration flow 720, the STRADL file system 130 uses temperature management to expire data from read caches. The volatile memory 402 and the reliable storage 240 can serve as short-term and medium-term read caches, respectively. At each consistency point, the temperature of data stored in each of the read caches can be evaluated to determine whether the cached data has become cold or stale. If the cached data is found to be stale, then it is deleted from the underlying cache tier. The process of deleting expired data from a cache tier is called "read cache expiration".

Staleness of cached data can be determined based on the access time associated with the data and comparing the access time with a predefined temporal parameter. The temporal parameter can be one day, one week, one month, and so on. Consider an example where the temporal parameter is one week and the access time associated with cached data in the volatile tier indicates that the data has not been accessed for a week. In such a case, the cached data is expired from the volatile read cache. In implementations, the access time can be maintained on a per-slab basis in an access time table and the temporal parameter can be defined on a per-tier basis in a staleness table.

In the read operation flow 730, the STRADL file system 130 brings a copy of requested data from the fastest storage tier (i.e., the volatile memory 402) to the read buffer 701. If the data requested in the read operation is not present in the volatile memory 402, then it is reinstated into the read buffer 701 from the next fastest tier, which could be the reliable storage 240 or the highly reliable storage 244. In the example shown in FIG. 7, the requested data is reinstated from the reliable storage 240. If the requested data is not available in the reliable storage 240, then it is reinstated from the highly reliable storage 244. In one implementation, the data reinstated into the read buffer is also copied to read buffers in volatile memory 402 and reliable storage 240. The data stays in the read cache and follows the read cache expiration flow 720 described above.

Particular Implementations

The technology disclosed relates to transparently copy data across multiple storage tiers of multiple cloud-based storage platforms.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions to run a file system on a node that transparently deploys file blocks across multiple tiers of storage.

The multiple tiers of storage that host data via file system application programming interfaces (abbreviated APIs), include a volatile storage (abbreviated VS) tier with a VS API, a reliable non-volatile storage (abbreviated RNVS) tier with a RNVS API, and a highly reliable non-volatile storage (abbreviated HRNVS) tier with a HRNVS API. An intermediary file system API presents to a host system a single interface and translates get, put, and other file system requests received via different access protocols into commands compatible with the VS API, the RNVS API, and the HRNVS API, without host system being aware of which of the multiple storage tiers holds requested data and metadata.

First, a write manager writes data, received via the intermediary file system API and destined for a file, to the volatile storage tier and marks it to be committed to the reliable non-volatile storage tier. Then, a consistency point flush manager periodically commits data from the volatile storage tier to the reliable non-volatile storage tier. Following this, a synchronization manager periodically synchronizes data from the reliable non-volatile storage tier to the highly reliable non-volatile storage tier.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The intermediary file system API controls storage of data across the storage tiers and interaction with the stored data based at least on a cost optimization policy and/or storage task selected by an organization. In such an implementation, the cost optimization policy and/or the storage task maps to service level objectives (abbreviated SLOs), including at least budget SLOs, cost SLOs, performance SLOs, health SLOs, data protection SLOs, and cloning SLOs. Further, in such an implementation, the intermediary file system API automatically determines storage parameters that meet the SLOs based at least on: cost metrics of the storage tiers, including storage cost, transmission cost, and access cost; performance characteristics of the storage tiers; durability characteristics of the storage tiers; and efficiency characteristics of the storage tiers. Further in such an implementation, the storage parameters further include at least: number of storage tiers, type of the storage tiers, media-type of the storage tiers, size of the storage tiers, time intervals between commit operations, time intervals between synchronization operations, size of the read cache, and size of the write cache.

The different access protocols further include at least network file system (abbreviated NFS), common internet file system (abbreviated CIFS), representational state transfer (abbreviated REST), internet small computer systems interface (abbreviated iSCSI), server message block (abbreviated SMB), file transfer protocol (abbreviated FTP), cloud data management interface (abbreviated CDMI), and apple filing protocol (abbreviated AFP).

The reliable non-volatile storage tier is mirrored, and the consistency point flush manager periodically mirrors data from the volatile storage tier to an intermediately reliable non-volatile storage.

The synchronization manager periodically synchronizes data from the intermediately reliable non-volatile storage to the highly reliable non-volatile storage tier.

The synchronization manager demirrors redundant persistence of data blocks stored in the intermediately reliable non-volatile storage following synchronization of the data blocks to the highly reliable non-volatile storage. Following this, the synchronization manager marks the synchronized data in the reliable non-volatile storage tier as a read cache instead of a write cache.

The consistency point flush manager remirrors updated data blocks in the reliable non-volatile storage tier following copying of the updated data blocks from the volatile storage tier to a read cache in the reliable non-volatile storage tier. Following this, the consistency point flush manager marks the updated data blocks as a write cache awaiting synchronization.

The highly reliable non-volatile storage tier hosts a third native file system. The third native file system has third characteristics. The highly reliable non-volatile storage tier is slower and less expensive than the reliable non-volatile storage tier.

The reliable non-volatile storage tier hosts a second native file system. The second native file system has second characteristics that are disjoint from the third characteristics of the third native file system.

The volatile storage tier hosts a first native file system. The volatile storage tier is faster and more expensive than the reliable non-volatile storage tier.

The multiple tiers of storage include a non-volatile memory tier that hosts a fourth native file system. The non-volatile memory tier is faster and more expensive than the reliable non-volatile storage tier and is slower and less expensive than the volatile storage tier.

The multiple tiers of storage include an instance non-volatile storage tier that hosts a fifth native file system. The instance non-volatile storage tier is faster and less reliable than the reliable non-volatile storage tier and is slower and more reliable than the volatile storage tier.

The write manager includes one or more processors that perform initial writing operations that include, first, receiving, from a client, a new write request to write data. Following this sending the data to the volatile storage tier and in parallel to the transaction log. Afterwards receiving, from the volatile storage tier and the transaction log, a write completion message. Following this providing an acknowledgment, to the client, acknowledging that the initial writing operations are successful.

The consistency point flush manager includes one or more processors that perform commit operations that include, first, temporarily freezing data in the volatile storage tier at consistency points. Following this, copying data that has changed between consistency points in the volatile storage tier to the reliable non-volatile storage tier.

The synchronization manager includes one or more processors that perform synchronization operations that include, first, freezing data in the reliable non-volatile storage tier in durable snapshots. Following this, copying changed durable snapshots from the reliable non-volatile storage tier to the highly reliable non-volatile storage tier.

The volatile storage tier includes a cache manager that tracks staleness of each data block that already has been copied to the reliable non-volatile storage tier. When a data block staleness has exceeded a criteria, the cache manager expires the stale data block from the volatile storage tier and updates a block table to indicate that the stale data block is to be retrieved from the reliable non-volatile storage tier.

The reliable non-volatile storage tier includes a cache manager that tracks staleness of each data block that already has been copied to the highly reliable non-volatile storage tier. When a data block staleness has exceeded a criteria, the cache manager expires the stale data block from the reliable non-volatile storage tier and updates a block table to indicate that the stale data block is to be retrieved from the highly reliable non-volatile storage tier.

The file system includes a read manager with one or more processors that perform read operations via the intermediary file system API irrespective of a storage tier from which data is fetched in response to a read request. The read manager performs read operations including determining which storage tier is a fastest storage tier that holds the data responsive to the read request. Following this determining, retrieving the data responsive to the read request, and when the fastest storage tier that holds the data is not the volatile storage tier, caching the retrieved data in the volatile storage tier.

The multiple tiers of storage are distributed across different cloud-based storage platforms.

The multiple tiers of storage include multiple reliable non-volatile storage tiers with disjoint storage media characteristics. The multiple highly reliable non-volatile storage tiers with disjoint storage media characteristics, and multiple instance non-volatile storage tiers with disjoint storage media characteristics.

The file system includes a service level objective (SLO) manager with one or more processors that, in dependence upon a predetermined cost optimization policy, control at least, number of storage tiers, type of the storage tiers, size of the storage tiers, time intervals between commit operations, time intervals between synchronization operations, size of the read cache, and size of the write cache.

Other implementations may include a non-transitory computer readable storage medium storing instructions executable by a processor to perform functions of the system described above. Yet another implementation may include a method performing the functions of the system described above.

A method implementation of the technology disclosed includes transparently deploying file blocks across multiple tiers of storage, with flushing and synchronizing of data from volatile to reliable and highly reliable non-volatile storage.

The method includes, hosting data across multiple tiers of storage via file system application programming interfaces (abbreviated APIs), including volatile storage (abbreviated VS) tier with a VS API, reliable non-volatile storage (abbreviated RNVS) tier with a RNVS API, and highly reliable non-volatile storage (abbreviated HRNVS) tier with a HRNVS API.

The method further includes presenting to a host system, via an intermediary file system API, a single interface and translating get, put, and other file system requests received via different access protocols into commands compatible with the VS API, the RNVS API, and the HRNVS API, without host system awareness of which of the multiple tiers holds requested data and metadata.

The method further includes writing, using a write manager, data, received via the intermediary file system API and destined for a file, to the volatile storage tier and marking it to be committed to the reliable non-volatile storage tier.

Following this the method includes, periodically committing, using a consistency point flush manager, data from the volatile storage tier to the reliable non-volatile storage tier.

Further following this, the method includes, periodically synchronizing, using a synchronization manager, data from the reliable non-volatile storage tier to the highly reliable non-volatile storage tier.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

The technology disclosed relates to transparently copy data across multiple storage tiers of multiple cloud-based storage platforms.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions to reduce runaway costs of storing data in cloud-based storage platforms, the instructions, when executed on the processors implement the following actions.

First, the system, receives a cost optimization policy and identifies one or more service level objectives (abbreviated SLOs) mapped to the cost optimization policy. Then, the system, automatically determines storage parameters that meet the SLOs based at least on cost metrics and storage characteristics of multiple storage tiers of one or more cloud-based storage platforms, the storage parameters include type of storage tiers, media-type of storage tiers, and size of storage tiers. Following this, the system stores data across the multiple storage tiers in accordance with the computed storage parameters. Finally, the system makes the stored data available to a host system by translating file system requests received via different access protocols into commands compatible with file system application programming interfaces (APIs) of the multiple storage tiers, without host system awareness of which of the storage tiers holds requested data and metadata.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The storage parameters include time intervals between committing data between the multiple storage tiers, and time intervals between synchronizing data between the multiple storage tiers.

The storage parameters enforce storing frequently accessed hot data in faster, more expensive storage tier, and storing infrequently accessed cold data in slower, less expensive storage tier.

The SLOs include budget SLOs, cost SLOs, and performance SLOs. The SLOs also include health SLO, data protection SLOs, and cloning SLOs.

The cost metrics of the multiple storage tiers include cost of storing data, cost of writing data, and cost of reading data.

The storage characteristics of the multiple storage tiers include reliability, latency, and throughput. The storage characteristics also include input/output operations per second (abbreviated IOPS), deduplication and compression.

The multiple storage tiers include a volatile storage (abbreviated VS) tier with a VS API, a reliable non-volatile storage (abbreviated RNVS) tier with a RNVS API, and a highly reliable non-volatile storage (abbreviated HRNVS) tier with a HRNVS API. The multiple storage tiers also include a non-volatile memory storage (abbreviated NVMS) tier with a NVMS API, and an instance non-volatile storage (abbreviated INVS) tier with an INVS API.

The different access protocols include network file system (abbreviated NFS), common internet file system (abbreviated CIFS), representational state transfer (abbreviated REST), and internet small computer systems interface (abbreviated iSCSI). The different access protocols also include server message block (abbreviated SMB), file transfer protocol (abbreviated FTP), cloud data management interface (abbreviated CDMI), and apple filing protocol (abbreviated AFP).

The system includes receiving a storage task and identifying one or more SLOs mapped to the storage task The system also includes receiving a plurality of cost optimization policies and identifying SLOs mapped to each of the cost optimization policies.

Other implementations may include a non-transitory computer readable storage medium storing instructions executable by a processor to perform functions of the system described above. Yet another implementation may include a method performing the functions of the system described above.

A method implementation of the technology disclosed includes reducing runaway costs of storing data in cloud-based storage platforms.

First, the method receives a cost optimization policy and identifies one or more service level objectives (abbreviated SLOs) mapped to the cost optimization policy. Then, the method automatically determines storage parameters that meet the SLOs based at least on cost metrics and storage characteristics of multiple storage tiers of one or more cloud-based storage platforms, the storage parameters include type of storage tiers, media-type of storage tiers, and size of storage tiers. Following this, the method stores data across the multiple storage tiers in accordance with the computed storage parameters. Finally, the method makes the stored data available to a host system by translating file system requests received via different access protocols into commands compatible with file system application programming interfaces (APIs) of the multiple storage tiers, without host system awareness of which of the storage tiers holds requested data and metadata.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What we claim is:

1. A file system running on a node that transparently deploys file blocks across multiple tiers of storage, with flushing and synchronizing of data from volatile to first type and second type non-volatile storage, the system comprising one or more processors and memory storing instructions that, when executed by a processor of the one or more processors implement:
   storing in multiple tiers of storage host data received from and provided to a host system via file system application programming interfaces (abbreviated APIs), the multiple tiers of storage including:
   a volatile storage (abbreviated VS) tier with a VS API,
   a first type non-volatile storage (abbreviated RNVS) tier with a RNVS API, and exhibiting a first reliability criterion, the first reliability criterion being greater than a reliability of the volatile storage; and
   a second type non-volatile storage (abbreviated HRNVS) tier with a HRNVS API, and exhibiting a second reliability criterion, the second reliability criterion being greater than the first reliability criterion, and
   tracking staleness of each data block in the volatile storage tier that already has been copied to the first type non-volatile storage tier, and when a data block staleness has exceeded a criterion, expiring the data block from the volatile storage tier and updating a block table to indicate that the data block is to be retrieved from the first type non-volatile storage tier;
   presenting to a host system a single interface for receiving data from the host for storage into the multiple tiers of storage or providing data retrieved from the multiple tiers of storage;
   translating file system requests received via different access protocols into commands compatible with the VS API, the RNVS API, and the HRNVS API, without host system awareness of which of the multiple tiers holds requested data and metadata;
   writing data received from the host via the single interface and destined for a file, by sending a message to the volatile storage tier and marking the data to be committed to the first type non-volatile storage tier;
   periodically committing at least some data from the volatile storage tier to the first type non-volatile storage tier by writing received messages into a second dataspace while a first dataspace having reached a consistency point is emptied to the first type non-volatile storage tier; and
   periodically synchronizing at least some data from the first type non-volatile storage tier to the second type non-volatile storage tier by copying data detected as changed from the first type non-volatile storage tier to corresponding data in the second type non-volatile storage tier.

2. The system of claim 1, wherein the instructions when executed by the processor further implement controlling storage of data across the storage tiers and interaction with the stored data based at least on a cost optimization policy and/or storage task selected by an organization.

3. The system of claim 2, wherein the cost optimization policy and/or the storage task maps to service level objectives (abbreviated SLOs), including at least budget SLOs, cost SLOs, performance SLOs, health SLOs, data protection SLOs, and cloning SLOs.

4. The system of claim 3, wherein the instructions when executed by the processor further implement automatically determining storage parameters that meet the SLOs based at least on:
   cost metrics of the storage tiers, including storage cost, transmission cost, and access cost;
   performance characteristics of the storage tiers;
   durability characteristics of the storage tiers; and
   efficiency characteristics of the storage tiers.

5. The system of claim 1, wherein the different access protocols further include at least network file system (abbreviated NFS), common internet file system (abbreviated CIFS), representational state transfer (abbreviated REST), internet small computer systems interface (abbreviated iSCSI), server message block (abbreviated SMB), file transfer protocol (abbreviated FTP), cloud data management interface (abbreviated CDMI), and apple filing protocol (abbreviated AFP).

6. The system of claim 1, wherein the first type non-volatile storage tier is mirrored, and data from the volatile storage tier is periodically mirrored to a third type non-volatile storage, and
   wherein data from the third type non-volatile storage is periodically synchronized to the second type non-volatile storage tier.

7. The system of claim 6, wherein the instructions when executed by the processor further implement demirroring redundant persistence of data blocks stored in the third type non-volatile storage following synchronization of the data blocks to the second type non-volatile storage, and marks the synchronized data in the first type non-volatile storage tier as a read cache instead of a write cache.

8. The system of claim 1, wherein the second type non-volatile storage tier hosts a third native file system, the third native file system has third characteristics, and the second type non-volatile storage tier is slower and less expensive than the first type non-volatile storage tier.

9. The system of claim 8, wherein the first type non-volatile storage tier hosts a second native file system, and the second native file system has second characteristics that are disjoint from the third characteristics of the third native file system.

10. The system of claim 9, wherein the volatile storage tier hosts a first native file system, and the volatile storage tier is faster and more expensive than the first type non-volatile storage tier.

11. The system of claim 1, wherein the multiple tiers of storage include an instance non-volatile storage tier that hosts a fifth native file system, and the instance non-volatile storage tier is faster and less reliable than the first type non-volatile storage tier and is slower and more reliable than the volatile storage tier.

12. The system of claim 1, wherein the instructions when executed by the processor further implement performing initial writing operations including:
receiving, from a client, a new write request to write data;
sending the data to the volatile storage tier and in parallel to a transaction log;
receiving, from the volatile storage tier and the transaction log, a write completion message; and
providing an acknowledgment, to the client, acknowledging that the initial writing operations are successful.

13. The system of claim 1, wherein the instructions when executed by the processor further implement performing commit operations including:
temporarily freezing data in the volatile storage tier at consistency points; and
copying data that has changed between consistency points in the volatile storage tier to the first type non-volatile storage tier.

14. The system of claim 1, wherein the instructions when executed by the processor further implement performing synchronization operations including:
freezing data in the first type non-volatile storage tier during durable snapshots; and
copying changed durable snapshots from the first type non-volatile storage tier to the second type non-volatile storage tier.

15. The system of claim 1, wherein the first type non-volatile storage tier includes a cache manager that:
tracks staleness of each data block that already has been copied to the second type non-volatile storage tier; and
when a data block staleness has exceeded a criteria, expires the data block from the first type non-volatile storage tier and updates a block table to indicate that the data block is to be retrieved from the second type non-volatile storage tier.

16. The system of claim 15, further including:
determining which storage tier is a fastest storage tier that holds the data responsive to a read request; and retrieving the data responsive to the read request, and when the fastest storage tier that holds the data is not the volatile storage tier, caching the retrieved data in the volatile storage tier.

17. The system of claim 1, wherein the multiple tiers of storage are distributed across different cloud-based storage platforms.

18. A method of transparently deploying file blocks across multiple tiers of storage, with flushing and synchronizing of data from volatile to first type and second type non-volatile storage, the method including:
hosting data received from and provided to a host system across multiple tiers of storage via file system application programming interfaces (abbreviated APIs), the multiple tiers of storage including:
a volatile storage (abbreviated VS) tier with a VS API,
a first type non-volatile storage (abbreviated RNVS) tier with a RNVS API, and exhibiting a first reliability criterion, the first reliability criterion being greater than a reliability of the volatile storage, and
a second type non-volatile storage (abbreviated HRNVS) tier with a HRNVS API, and exhibiting a second reliability criterion, the second reliability criterion being greater than the first reliability criterion;
tracking staleness of each data block in the volatile storage tier that already has been copied to the first type non-volatile storage tier, and when a data block staleness has exceeded a criterion, expiring the data block from the volatile storage tier and updating a block table to indicate that the data block into be retrieved from the first type non-volatile storage tier;
presenting to a host system, a single interface for receiving data from the host for storage into the multiple tiers of storage or providing data retrieved from the multiple tiers of storage;
translating file system requests received via different access protocols into commands compatible with the VS API, the RNVS API, and the HRNVS API, without host system awareness of which of the multiple tiers holds requested data and metadata;
writing data received from the host via the single interface and destined for a file, by sending a message to the volatile storage tier and marking the data to be committed to the first type non-volatile storage tier;
periodically committing at least some data from the volatile storage tier to the first type non-volatile storage tier; and
periodically synchronizing data from the first type non-volatile storage tier to the second type non-volatile storage tier.

19. A non-transitory computer readable storage medium impressed with computer program instructions, the instructions, when executed on a processor, implement a file system that transparently deploys file blocks across multiple tiers of storage, with flushing and synchronizing of data from volatile to reliable and highly reliable non-volatile storage, the file system configurable to carry out a method comprising:
hosting data received from and provided to a host system across multiple tiers of storage via file system application programming interfaces (abbreviated APIs), including:
a volatile storage (abbreviated VS) tier with a VS API,
a first type non-volatile storage (abbreviated RNVS) tier with a RNVS API, and exhibiting a first reliability criterion, the first reliability criterion being greater than a reliability of the volatile storage, and a second type non-volatile storage (abbreviated HRNVS) tier with a HRNVS API, and exhibiting a second reliability criterion, the second reliability criterion being greater than the first reliability criterion;

tracking staleness of each data block in the volatile storage tier that already has been copied to the first type non-volatile storage tier, and when a data block staleness has exceeded a criterion, expiring the data block from the volatile storage tier and updating a block table to indicate that the data block is to be retrieved from the first type non-volatile storage tier;

presenting to a host system a single interface for receiving data from the host for storage into the multiple tiers of storage or providing data retrieved from the multiple tiers of storage;

translating file system requests received via different access protocols into commands compatible with the VS API, the RNVS API, and the HRNVS API, without host system awareness of which of the multiple tiers holds requested data and metadata;

writing data received from the host via the single interface and destined for a file, by sending a message to the volatile storage tier and marking the data to be committed to the first type non-volatile storage tier;

periodically committing at least some data from the volatile storage tier to the first type non-volatile storage tier; and periodically synchronizing at least some data from the first type non-volatile storage tier to the second type non-volatile storage tier.

* * * * *